United States Patent
Hoffmann et al.

(10) Patent No.: US 9,644,111 B2
(45) Date of Patent: *May 9, 2017

(54) POLYURETHANE COATING MATERIAL COMPOSITION, MULTI-STAGE COATING METHODS

(71) Applicant: BASF Coatings GmbH, Münster (DE)

(72) Inventors: Peter Hoffmann, Senden (DE); Matthijs Groenewolt, Münster (DE); Benedikt Schnier, Warendorf (DE); Elke Westhoff, Steinfurt (DE)

(73) Assignee: BASF Coatings GmbH, Muenster (DE)

(*) Notice: Subject to any disclaimer, the term of this patent is extended or adjusted under 35 U.S.C. 154(b) by 133 days.

This patent is subject to a terminal disclaimer.

(21) Appl. No.: 14/416,493

(22) PCT Filed: May 29, 2013

(86) PCT No.: PCT/EP2013/061084
§ 371 (c)(1),
(2) Date: Jan. 22, 2015

(87) PCT Pub. No.: WO2014/016019
PCT Pub. Date: Jan. 30, 2014

(65) Prior Publication Data
US 2015/0210886 A1 Jul. 30, 2015

Related U.S. Application Data

(60) Provisional application No. 61/675,358, filed on Jul. 25, 2012.

(30) Foreign Application Priority Data

Jul. 25, 2012 (EP) ..................... 12177768

(51) Int. Cl.
| | | |
|---|---|---|
| *B32B 27/40* | (2006.01) | |
| *C09D 175/04* | (2006.01) | |
| *C08G 18/62* | (2006.01) | |
| *C08G 18/79* | (2006.01) | |
| *C08G 18/80* | (2006.01) | |
| *C08G 18/28* | (2006.01) | |
| *B05D 7/00* | (2006.01) | |

(52) U.S. Cl.
CPC .......... *C09D 175/04* (2013.01); *B05D 7/534* (2013.01); *B05D 7/544* (2013.01); *C08G 18/289* (2013.01); *C08G 18/6254* (2013.01); *C08G 18/792* (2013.01); *C08G 18/809* (2013.01); *B05D 7/53* (2013.01); *Y10T 428/31551* (2015.04)

(58) Field of Classification Search
CPC ...... C09D 175/04; B05D 7/544; B05D 7/534; B05D 7/53; Y10T 428/31551
See application file for complete search history.

(56) References Cited

U.S. PATENT DOCUMENTS

| | | |
|---|---|---|
| 4,006,124 A | 2/1977 | Welte et al. |
| 4,598,131 A | 7/1986 | Prucnal |
| 4,939,213 A | 7/1990 | Jacobs, III et al. |
| 5,084,541 A | 1/1992 | Jacobs, III et al. |
| 5,516,559 A | 5/1996 | Rockrath et al. |
| 5,716,678 A | 2/1998 | Rockrath et al. |
| 6,403,699 B1 | 6/2002 | Rockrath et al. |
| 7,487,529 B1 | 2/2009 | Orlick |
| 8,569,438 B2 | 10/2013 | Groenewolt et al. |
| 8,679,589 B2 | 3/2014 | Groenewolt et al. |
| 8,808,805 B2 | 8/2014 | Groenewolt et al. |
| 8,841,372 B2 | 9/2014 | Ireland |
| 9,139,751 B2* | 9/2015 | Westhoff ............ C08G 18/163 |
| 9,340,638 B2* | 5/2016 | Westhoff ............... C08G 18/16 |
| 9,340,703 B2* | 5/2016 | Hoffmann ........... C08G 18/163 |
| 2003/0027921 A1 | 2/2003 | Speier et al. |
| 2005/0182189 A1 | 8/2005 | Ohrbom et al. |
| 2006/0036007 A1 | 2/2006 | Hsieh et al. |

(Continued)

FOREIGN PATENT DOCUMENTS

| | | |
|---|---|---|
| DE | 102007061854 | 6/2009 |
| DE | 102008061329 | 6/2010 |

(Continued)

OTHER PUBLICATIONS

STIC Search Report dated Jul. 8, 2016.*

(Continued)

*Primary Examiner* — Eisa Elhilo
(74) *Attorney, Agent, or Firm* — Servilla Whitney LLC

(57) ABSTRACT

Described are nonaqueous coating material compositions comprising (A) at least one polyhydroxyl group-containing compound, (B) at least one polyisocyanate group-containing compound having free or blocked isocyanate groups, (D) at least one catalyst (D) based on a zinc-amidine complex which is preparable by reacting one or more zinc(II) biscarboxylates with an amidine of the formula (I) or with a mixture of two or more amidines of the formula (I)

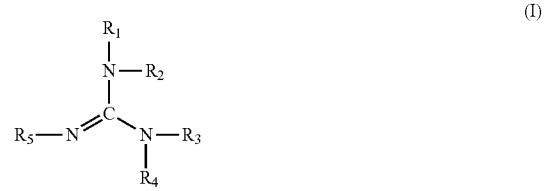

and (S) at least one monomeric aromatic optionally substituted carboxylic acid (S) whose carboxyl group is in conjugation with a π-electron system, wherein the component (B) comprises at least one structural unit —NR—(X—SiR"x(OR')3-x) (II), and/or at least one structural unit —N(X—SiR"x(OR')3-x)n(X'—SiR"y(OR')3-y)m (III). Also described are multistage coating methods, and the use of the coating material compositions.

14 Claims, No Drawings

(56) References Cited

U.S. PATENT DOCUMENTS

| | | | |
|---|---|---|---|
| 2006/0247341 A1 | 11/2006 | Hsieh et al. | |
| 2009/0011124 A1 | 1/2009 | Hsieh et al. | |
| 2010/0015344 A1 | 1/2010 | Groenewolt et al. | |
| 2011/0045190 A1* | 2/2011 | Groenewolt | C08G 18/1883 427/385.5 |
| 2011/0245406 A1 | 10/2011 | Klein et al. | |
| 2012/0100380 A1 | 4/2012 | Groenewolt | |
| 2014/0161981 A1 | 6/2014 | Westhoff et al. | |
| 2014/0162074 A1 | 6/2014 | Westhoff et al. | |
| 2014/0308451 A1 | 10/2014 | Westhoff et al. | |
| 2014/0322448 A1 | 10/2014 | Hoffmann et al. | |

FOREIGN PATENT DOCUMENTS

| | | |
|---|---|---|
| EP | 0008127 | 2/1980 |
| EP | 0249201 | 12/1987 |
| EP | 0624577 | 11/1994 |
| EP | 0626888 | 12/1994 |
| EP | 0692007 | 1/1996 |
| EP | 0276501 | 8/1998 |
| EP | 0994117 | 4/2000 |
| EP | 1273640 | 1/2003 |
| JP | S5626962 A | 3/1981 |
| JP | S5641265 A | 4/1981 |
| JP | H10338769 A | 12/1998 |
| JP | 2007063281 A | 3/2007 |
| JP | 2012511058 A | 5/2012 |
| WO | WO-93/15849 | 8/1993 |
| WO | WO-94/22968 | 10/1994 |
| WO | WO-94/22969 | 10/1994 |
| WO | WO-97/12945 | 4/1997 |
| WO | WO-01/09260 | 2/2001 |
| WO | WO-01/98393 | 12/2001 |
| WO | WO-2004/029121 | 4/2004 |
| WO | WO-2006/022899 | 3/2006 |
| WO | WO-2008/074489 | 6/2008 |
| WO | WO-2008/074490 | 6/2008 |
| WO | WO-2008/074491 | 6/2008 |
| WO | WO-2009/077180 | 6/2009 |
| WO | WO-2009/077181 | 6/2009 |
| WO | WO-2009/135600 | 11/2009 |
| WO | WO-2010/149236 | 12/2010 |
| WO | WO-2011/114021 | 9/2011 |
| WO | WO-2012/123161 | 9/2012 |
| WO | WO-2012/123166 | 9/2012 |
| WO | WO-2012/123198 | 9/2012 |
| WO | WO-2012/126796 | 9/2012 |
| WO | WO-2013/110712 | 8/2013 |

OTHER PUBLICATIONS

PCT International Preliminary Report on Patentability in PCT/EP2013/061084, mailed Feb. 5, 2015, 7 pages.

PCT International Search Report in PCT/EP2013/061084, mailed Oct. 1, 2013, 4 pages.

Partial English translation of Japanese Patent Appln. Publication No. S56-26962 dated Mar. 16, 1981, 6 pages.

Partial English translation of Japanese Patent Appln. Publication No. S56-41265 dated Apr. 17, 1981, 3 pages.

* cited by examiner

POLYURETHANE COATING MATERIAL COMPOSITION, MULTI-STAGE COATING METHODS

CROSS-REFERENCE TO RELATED APPLICATIONS

This is application is the National Stage Entry of PCT/EP2013/061084, filed May 29, 2013, which claims priority to U.S. Provisional Application Ser. No. 61/675,358, filed Jul. 25, 2012, and European Patent Application 12177768.4, filed Jul. 25, 2012, the disclosures of which are incorporate herein by reference in their entireties.

TECHNICAL FIELD

The present invention relates to coating material compositions comprising at least one polyhydroxyl group-containing compound (A), at least one polyisocyanate group-containing compound (B), and at least one catalyst (D) based on a zinc-amidine complex.

The present invention additionally provides multistage coating methods using these coating material compositions, and also the use of the coating material compositions as clearcoat material and/or pigmented coating material, and use of the coating method for automotive refinish and/or for the coating of parts for installation in or on automobiles, of plastics substrates and/or of utility vehicles.

BACKGROUND

Polyurethane coating materials typically comprise a catalyst, and in this context not only acidic compounds but also, in particular, tertiary amines and/or metallic compounds, such as various tin compounds, for example, more particularly dibutyltin dilaurate and dibutyltin oxide, are employed.

The employment of tin-containing catalysts is to be avoided in coating materials, as elsewhere, because of the toxicity inherent in many tin compounds. The EU Commission's Working Group on Classification and Labelling" have categorized dibutyltin oxide (DBTO) and dibutyltin dilaurate (DBTL) accordingly.

The article available on the Internet at the address www.wernerblank.com and titled "Catalysis of the Isocyanate-Hydroxyl Reaction by Non-Tin Catalysts" by Werner J. Blank, Z. A. He and Ed. T. Hessell from the company King Industries Inc. therefore describes alternatives to the customary tin-containing catalysts based on various metal salts and metal complexes, such as zirconium chelates, aluminum chelate, and bismuth carboxylate.

DE 10 2008 061 329 A1 and WO 09/135600 disclose coating materials where the use of metallic catalysts is to be avoided as far as possible and which instead comprise, as catalyst, 1,3-substituted imidazolium salts for the deblocking of blocked polyisocyanates in polyurethane coating materials.

WO04/029121 describes polyurethane compositions which are stabilized in terms of the reactivity of the composition by addition of acids with a pKa range between 2.8 and 4.5, these acids being able to be utilized at the same time as catalyst. Acids used in this context and with a pKa range between 2.8 and 4.5 include, for example, benzoic acid, hydroxybenzoic acid, salicylic acid, phthalic acid, and so on. The compositions preferably comprise no further catalyst, although in addition it is also possible to use the typical known polyurethane catalysts, such as tertiary amines or amidines or organometallic compounds, such as tin compounds more particularly. Where amines are used as catalyst, it is necessary to employ great care in the selection of the type of amine and its amount, since the aminic catalysts are able in part to eliminate the stabilizing action of the organic acids added.

Furthermore, U.S. Pat. No. 7,485,729 B2 and also the equivalent specifications WO06/022899, US 2006/0247341 A1 and US 2009/0011124 A1, describe organometallic compounds and coating materials comprising them. Coating materials described are powder coating materials based on hydroxyl-containing polyacrylates and/or polyesters and on uretdione-group-containing polyisocyanates; liquid paints based on hydroxyl-containing polyacrylates and/or polyesters and on blocked polyisocyanates; and solventborne coating materials based on epoxy/carboxyl and/or epoxy/anhydride components. The organometallic compounds used as catalysts are, in addition to other metal-amidine complexes, cyclic or acyclic zinc biscarboxylate-bis-amidine complexes, such as, for example, Zn(1,1,3,3-tetramethylguanidine)$_2$ (2-ethylhexanoate)$_2$.

Furthermore, WO 2001/98393, WO08/74491, WO 08/74490, WO 08/74489, WO09/077181 and WO 10/149236 disclose coating material compositions which comprise at least one hydroxyl-containing compound (A), at least one compound (B) containing isocyanate groups and silane groups, and a catalyst suitable for the crosslinking of the silane groups. Catalysts used are phosphorus-containing catalysts, more particularly phosphorus- and nitrogen-containing catalysts. These coating material compositions have the advantage over conventional polyurethane coating materials of a significantly enhanced scratch resistance in conjunction with good weathering stability.

Further, EP-A-1 273 640 describes 2-component coating materials comprising a polyol component and a crosslinker component, consisting of aliphatic and/or cycloaliphatic polyisocyanates or the polyisocyanates derived from them by polymerization, allophanatization, biuretization or urethaneization, where 0.1 to 95 mol % of the originally free isocyanate groups present have reacted with bisalkoxysilylamine.

Finally, PCT patent applications PCT/EP2012/052284, PCT/EP2012/051444, PCT/EP2012/051574, PCT/EP2012/054546, not yet laid open, and European patent application No. 12152406.0, not yet laid open, describe coating material compositions which as well as at least one polyhydroxyl group-containing compound (A), at least one polyisocyanate group-containing compound (B) and at least one catalyst (D) based on a zinc-amidine complex, also comprise at least one monomeric aromatic, optionally substituted carboxylic acid (S), whose carboxyl group is conjugated with a π-electron system.

SUMMARY

Provided, therefore, are coating material compositions, more particularly for automotive refinish and for the coating of utility vehicles, that ensure good assembly strength after just a very short time, meaning that they ought to ensure rapid curing even under the conditions of refinish and of the finishing of utility vehicles, in other words ought after curing at 60° C. for 30 minutes already to have undergone curing to an extent such that initial assembly operations or demasking operations can be carried out without damage to the coating. At the same time, however, the coating material compositions, at room temperature and after mixing of the binder component with the isocyanate component, have a good potlife of at least 2 hours. As used herein, the term "potlife" refers to the period of time within which the coating material composition has attained twice its initial viscosity. Moreover, the coating material compositions leads to coatings exhibiting good through-curing and sufficient ultimate hardness. Furthermore, these coating materials do not to show any color changes before and after curing. High demands are placed on the intrinsic color of the systems, particularly in the field of clearcoat materials in the automobile industry. Thus the catalyst neither exhibits any intrinsic color and nor does it lead to discoloring at mixing or during curing of the coating material when the catalyst is mixed with the typical components of a coating material.

Furthermore, the catalyst is able to be added to the binder component of the coating material composition from the outset. However, this admixing of the catalyst to the binder component from the outset does not to cause any adverse effect on the shelflife thereof. Furthermore, the catalyst is insensitive to hydrolysis, since even in systems in organic solution, the typically high concentration of hydroxyl groups can result in a reduction in catalyst activity over the storage period. Especially in the automotive refinish segment, an extremely long shelflife even at relatively high temperatures is an advantage.

Moreover, the coating material compositions lead to coatings which have a high degree of scratch resistance and more particularly a high gloss retention after scratch exposure, and lead to a highly weathering-stable network, while at the same time ensuring high acid resistance. Moreover, the coatings and paint systems, especially the clearcoat systems, are able to be produced even in film thicknesses >40 μm without stress cracks appearing. Furthermore, a good overall visual appearance, as it is known, is also ensured.

Lastly, the new coating materials are able to be prepared simply and with very good reproducibility, and do not to cause any environmental problems during application.

DETAILED DESCRIPTION

In one or more embodiments, provided are nonaqueous coating material compositions comprising
(A) at least one polyhydroxyl group-containing compound (A),
(B) at least one polyisocyanate group-containing compound (B) having free or blocked isocyanate groups and
and
(D) at least one catalyst (D) based on a zinc-amidine complex which is preparable by reacting one or more zinc(II) biscarboxylates with an amidine of the formula (I) or with a mixture of two or more amidines of the formula (I)

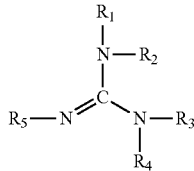

(I)

wherein $R_5$=hydrogen and $R_1$, $R_2$, $R_3$, and $R_4$ are each identical or different radicals, with $R_1$ and $R_3$ being hydrogen or an alkyl radical or an aryl radical, and $R_2$ and $R_4$ being an alkyl radical or an aryl radical, wherein
component (B) has at least one structural unit of the formula (II)

—NR—(X—SiR''$x$(OR')3-$x$)    (II), and/or at least one structural unit of the formula (III)

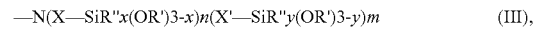

—N(X—SiR''$x$(OR')3-$x$)$n$(X'—SiR''$y$(OR')3-$y$)$m$    (III), wherein
R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl, or aralkyl, it being possible for the carbon chain to be interrupted by nonadjacent oxygen, sulfur or NRa groups, where Ra=alkyl, cycloalkyl, aryl or aralkyl, preferably R''=alkyl radical, more particularly having 1 to 6 C atoms, n=0 to 2, m=0 to 2, m+n=2, and x, y=0 to 2,
and in that the coating material composition comprises
(S) at least one monomeric aromatic optionally substituted carboxylic acid (S) whose carboxyl group is in conjugation with a π-electron system.

In one or more embodiments, provided are multistage coating methods using these coating material compositions, and also the use of the coating material compositions as clearcoat material and/or pigmented coating material, and use of the coating method for automotive OEM finishing, automotive refinish and/or for the coating of parts for installation in or on automobiles, of plastics substrates and/or of utility vehicles.

It is surprising and was not foreseeable that the coating material compositions ensure good assembly strength after just a very short time under the conditions for automotive refinish, in other words they ensure rapid curing even under the conditions of refinish, thus being tack-free as soon as possible after curing at 60° C. At the same time, at room temperature and after mixing of the binder component with the isocyanate component, however, the coating material compositions exhibit a good potlife of at least 2 hours. Potlife, as used herein, refers to the period of time within which the coating material composition has attained twice its initial viscosity.

Moreover, in one or more embodiments, the coating material compositions lead to coatings having good through-curing and a sufficient ultimate hardness. Furthermore, in one or more embodiments, the catalyst does not exhibit an intrinsic color, nor does it lead, with the conventional coating components, to a discoloration at mixing or during curing of the coating material.

Furthermore, in one or more embodiments, the catalyst can be added to the binder component of the coating material composition from the outset without adversely affecting the shelflife of the binder-containing component of the coating material composition. Furthermore, the catalyst is insensitive to hydrolysis, and so the typically high concentration of hydroxyl groups does not result in any reduction in the catalyst activity over the storage period, even in systems in organic solution, and this is an advantage especially in the automotive refinish segment.

In one or more embodiments, the coating material compositions also lead to coatings which have a high degree of scratch resistance and in particular exhibit high gloss retention after scratch exposure.

Furthermore, the coating material compositions lead to a highly weathering-stable network and at the same time ensure high acid resistance of the coatings. Moreover, the coatings and paint systems, especially the clearcoat systems, can be produced even in film thicknesses >40 μm without stress cracks appearing. Also, furthermore, a good overall visual appearance, as it is known, is ensured.

Lastly, the new coating material compositions can be prepared easily and with very good reproducibility, and do not cause any environmental problems during application.

The Coating Material

In particular, the coating materials of one or more embodiments are thermally curable coating materials, i.e. coating materials which are substantially free of radiation-curable unsaturated compounds, in particular are completely free of radiation-curable unsaturated compounds.

The Polyhydroxyl Group-Containing Compound (A)

As polyhydroxyl group-containing compound (A), in one or more embodiments, it is possible to use all compounds known to the skilled person which have at least 2 hydroxyl groups per molecule and are oligomeric and/or polymeric. As component (A) it is also possible to use mixtures of different oligomeric and/or polymeric polyols.

In one or more embodiments, the oligomeric and/or polymeric polyols (A) have mass-average molecular weights Mw>500 daltons, measured by means of gel permeation chromatography (GPC) against a polystyrene standard, specifically between 800 and 100,000 daltons, more particularly between 1000 and 50,000 daltons.

In one or more specific embodiments, the oligomeric and/or polymeric polyols (A) are polyester polyols, polyurethane polyols, polysiloxane polyols, polyacrylate polyols and/or polymethacrylate polyols, and also copolymers thereof, referred to below as polyacrylate polyols.

In one or more embodiments, the polyols have an OH number of 30 to 400 mg KOH/g, more particularly between 100 and 300 KOH/g. The hydroxyl number (OH number) indicates the number of mg of potassium hydroxide that are equivalent to the amount of acetic acid bound by 1 g of substance on acetylation. For the determination, the sample is boiled with acetic anhydride-pyridine and the resultant acid is titrated with potassium hydroxide solution (DIN 53240-2). In the case of pure poly(meth)acrylates, the OH number may also be determined with sufficient accuracy by calculation on the basis of the OH-functional monomers used.

In one or more embodiments, the glass transition temperatures, measured by means of DSC measurement in accordance with DIN EN ISO 11357-2, of the polyols are preferably between −150 and 100° C., more preferably between −120° C. and 80° C.

Suitable polyester polyols are described in EP-A-0 994 117 and EP-A-1 273 640, for example. In one or more embodiments, polyurethane polyols are prepared by reaction of polyester polyol prepolymers with suitable di- or polyisocyanates, and are described in EP-A-1 273 640, for example. Suitable polysiloxane polyols are described in WO-A-01/09260, for example, and the polysiloxane polyols recited therein may be employed preferably in combination with other polyols, more particularly those having higher glass transition temperatures.

In specific embodiments, component (A) comprises one or more polyacrylate polyols and/or polymethacrylate polyols. Together with the polyacrylate polyol(s) and/or polymethacrylate polyol(s) it is possible for other oligomeric and/or polymeric polyhydroxyl group-containing compounds to be employed, examples being polyester polyols, polyurethane polyols, and polysiloxane polyols, especially polyester polyols.

In one or more embodiments, the poly(meth)acrylate polyols that are used are generally copolymers and have mass-average molecular weights Mw of between 1000 and 20,000 daltons, more particularly between 1500 and 10,000 daltons, in each case measured by means of gel permeation chromatography (GPC) against a polystyrene standard.

In one or more embodiments, the glass transition temperature of the copolymers is generally between −100 and 100° C., more particularly between −60 and <20° C. (measured by means of DSC measurements in accordance with DIN-EN-ISO 11357-2).

In one or more embodiments, the poly(meth)acrylate polyols have an OH number of 60 to 300 mg KOH/g, more particularly between 70 and 200 KOH/g, and also an acid number of between 0 and 30 mg KOH/g.

The hydroxyl number (OH number) is determined as described above (DIN 53240-2). The acid number here indicates the number of mg of potassium hydroxide consumed for the neutralization of 1 g of the compound in question (DIN EN ISO 2114).

In one or more embodiments, as hydroxyl-containing monomer building blocks hydroxyalkyl acrylates and/or hydroxyalkyl methacrylates, such as more particularly 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate are used.

In one or more embodiments, as further monomer building blocks for the poly(meth)acrylate polyols alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate are used.

As further monomer building blocks for the poly(meth)acrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

Hydroxyl-Containing Compounds (C)

Optionally, in one or more embodiments, in addition to the polyhydroxyl group-containing component (A), the coating material compositions of the invention may further comprise one or more monomeric, hydroxyl-containing compounds (C), different from component (A). In one or more embodiments, these compounds (C) occupy a fraction of 0% to 20% by weight, more specifically of 0% to 10% by weight, very specifically of 1% to 5% by weight, based in each case on the binder fraction of the coating material composition.

As hydroxyl group-containing compound (C), use is made of low molecular mass polyols.

Low molecular mass polyols used are, for example, diols, such as ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol, and also polyols, such as trimethylolethane, trimethylolpropane, trimethylolhexane, 1,2,4-butanetriol, pentaerythritol, and dipentaerythritol. Preference is given to admixing low molecular mass polyols of this kind in minor fractions to the polyol component (A).

The Polyisocyanate Group-Containing Compounds (B)

In one or more embodiments, the di- and/or polyisocyanates serving as parent structures for the isocyanate group-containing compounds (B) are substituted or unsubstituted aromatic, aliphatic, cycloaliphatic and/or heterocyclic polyisocyanates that are known per se. Examples of polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g. Desmodur® W from Bayer AG), tetramethylxylyl diisocyanates (e.g., TMXDI® from American Cyanamid), and mixtures of the aforementioned polyisocyanates. Further specific polyisocyanates are the isocyanurate trimers and/or allophanate dimers and/or biuret dimers and/or uretdione dimers of the aforementioned diisocyanates.

In another embodiment of the invention, the polyisocyanates are polyisocyanate prepolymers having urethane structural units, which are obtained by reaction of polyols with a stoichiometric excess of aforementioned polyisocyanates. Polyisocyanate prepolymers of this kind are described in U.S. Pat. No. 4,598,131, for example.

In one or more embodiments, polyisocyanate parent structures for component (B) are hexamethylene diisocyanate, isophorone diisocyanate and 4,4'-methylenedicyclohexyl diisocyanate and/or the isocyanurate trimer and/or allophanate dimer and/or biuret dimer and/or uretdione dimer thereof.

The polyisocyanates and/or their isocyanurate trimers and/or their allophanate dimers and/or their biuret dimers and/or their uretdione dimers that are used as component (B) further comprise at least one structural unit of the formula (II)

—NR—(X—SiR"x(OR')3-x)   (II), and/or at least one structural unit of the formula (III)

—N(X—SiR"x(OR')3-x)n(X'—SiR"y(OR')3-y)m   (II), wherein
R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R"=alkyl, cycloalkyl, aryl, or aralkyl, it being possible for the carbon chain to be interrupted by nonadjacent oxygen, sulfur or NRa groups, where Ra=alkyl, cycloalkyl, aryl or aralkyl, preferably R"=alkyl radical, more particularly having 1 to 6 C atoms,
n=0 to 2, m=0 to 2, m+n=2, and x, y=0 to 2.

In one or more embodiments, the respective alkoxy radicals (OR') may be identical or different, but what is decisive for the structure of the radicals is the extent to which they influence the reactivity of the hydrolyzable silane groups. In specific embodiments, R' is an alkyl radical, more particularly having 1 to 6 C atoms. In very specific embodiments, radicals R' which increase the reactivity of the silane groups, i.e., represent good leaving groups, are used. Accordingly a methoxy radical is preferred over an ethoxy radical, which in turn is preferred over a propoxy radical. With particular preference, therefore, R'=ethyl and/or methyl, more particularly methyl.

The reactivity of organofunctional silanes may also, furthermore, be influenced considerably by the length of the spacers X, X' between silane functionality and organic functional group which serves for reaction with the constituent to be modified. Examples thereof that may be mentioned include the "alpha" silanes, which are obtainable from the company Wacker, and in which there is a methylene group, instead of the propylene group present in the case of "gamma" silanes, between Si atom and functional group.

In one or more embodiments, the components (B) used are functionalized with the structural units (II) and/or (III), and are obtained in particular by reaction of polyisocyanates and/or of isocyanurate trimers thereof and/or allophanate dimers thereof and/or biuret dimers thereof and/or uretdione dimers thereof with at least one compound of the formula (IIa)

H—NR—(X—SiR"x(OR')3-x)   (IIa)

and/or with at least one compound of the formula (IIIa)

HN(X—SiR"x(OR')3-x)n(X'—SiR"y(OR')3-y)m   (IIIa)

where the substituents have the definition given above.

In one or more embodiments, the components (B) used are functionalized with the structural units (II) and (III), and are obtained by reaction of polyisocyanates and/or of isocyanurate trimers thereof and/or allophanate dimers thereof and/or biuret dimers thereof and/or uretdione dimers thereof with at least one compound of the formula (IIa) and with at least one compound of the formula (IIIa), where the substituents have the definition given above.

In one or more embodiments, compounds (IIIa) which are preferred in accordance with the invention are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. In specific embodiments, bis(3-propyltrimethoxysilyl)amine is used. Aminosilanes of these kinds are available, for example, under the brand name DYNASYLAN® from DEGUSSA or Silquest® from OSI.

In one or more embodiments, compounds (IIa) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)propyl)alkylamines and/or N-(4-(triethoxysilyl)butyl)alkylamines. In specific embodiments, N-(3-(trimethoxy-silyl)propyl)butylamine is used. Aminosilanes of these kinds are available, for example, under the brand name DYNASYLAN® from DEGUSSA or Silquest® from OSI.

In one or more embodiments, in component (B), between 10 and 90 mol %, specifically between 20 and 80 mol %, more specifically more than 30 and less than 70 mol %, and very specifically between 31 and 50 mol % of the isocyanate groups originally present have been converted into structural units (II) and/or (III).

In one or more embodiments, the amount of structural units (II) in component (B) is between 5 and 70 mol %, more specifically between 8 and 50 mol %, very specifically between 9 and 40 mol %, based in each case on the entirety of the structural units (II) plus (III), and the total amount of structural units (III) in component (B) is between 95 and 30 mol %, more specifically between 92 and 50 mol %, and very specifically between 91 and 60 mol %, based in each case on the entirety of the structural units (II) plus (III).

In one or more embodiments, in the polyisocyanate component (B) more than 25 mol % and less than 36 mol %, specifically between 26 and 35 mol %, of the isocyanate groups originally present have been converted into bis-silane structural units (III).

In one or more embodiments, coating material compositions are obtained if, in component (B),
the total amount of structural units (II) is between 9 and 40 mol % and
the total amount of structural units (III) is between 91 and 60 mol %,
based in each case on the entirety of the structural units (II) plus (III), and
between 31 and 50 mol % of the isocyanate groups originally present in (B) have been converted into structural units (II) and (III), and
in component (B) between 26 and 35 mol % of the isocyanate groups originally present have been converted into structural units (III).

In one or more embodiments, the reaction of the isocyanate-group-containing compounds (B) with the compounds (IIa) and/or (IIIa) takes place in an inert gas atmosphere at temperatures of not more than 100° C., specifically of not more than 60° C.

In one or more embodiments, the free isocyanate groups of the isocyanate-group-containing compounds B may also be used in a blocked form. This is the case when the coating materials of the invention are used as one-component systems. For the blocking it is possible in principle to use any blocking agent which can be used for the blocking of polyisocyanates and has a sufficiently low deblocking temperature. Blocking agents of these kinds are very familiar to the skilled person. In one or more specific embodiments, blocking agents of the kind described in EP-A-0 626 888 and EP-A-0 692 007 are used.

Catalyst (D)

In one or more embodiments, the coating material composition comprises at least one catalyst (D) based on a zinc-amidine complex which is preparable by reacting one or more zinc(II) biscarboxylates with an amidine of the formula (I) or with a mixture of two or more amidines of the formula (I)

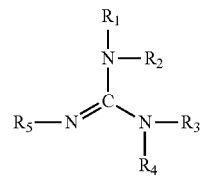

(I)

wherein $R_5$=hydrogen and $R_1$, $R_2$, $R_3$, and $R_4$ are each identical or different radicals, with $R_1$ and $R_3$ being hydrogen or an alkyl radical or an aryl radical, and $R_2$ and $R_4$ being an alkyl radical or an aryl radical.

In one or more embodiments, the zinc-amidine complex is either preparable by reacting 1.0 mole of one or more zinc(II) biscarboxylates with at least 0.1 mole, specifically with 1.0 to 4.0 moles, more specifically with 1.5 moles to 3.0 moles, and very specifically with 2.0 to 3.0 moles, of an amidine of the formula (I), or preparable by reacting 1.0 mole of one or more zinc(III) biscarboxylates with at least 0.1 mole, specifically with 1.0 to 4.0 moles, more specifically with 1.5 moles to 3.0 moles, and very specifically with 2.0 to 3.0 moles, of a mixture of two or more amidines of the formula (I).

In one or more embodiments, the catalyst (D) can be prepared more specifically by reacting 1.0 moles of a zinc(II) biscarboxylate with at least 0.1 mole, specifically with 1.0 to 4.0 moles, more specifically with 1.5 moles to 3.0 moles, and very specifically with 2.0 to 3.0 moles of an amidine of the formula (I).

In one or more embodiments, the radicals $R_2$ and $R_4$ are identical or different acyclic, straight-chain or branched alkyl radicals and/or identical or different aryl radicals. In specific embodiments, the radicals $R_1$ and $R_3$ are hydrogen or identical or different acyclic, straight-chain or branched alkyl radicals, and/or identical or different aryl radicals. The alkyl radicals may in each case optionally be present in the form of esters, ethers, etheresters, and ketones. The aryl radicals may be substituted by aliphatic esters, ethers, etheresters, and ketones, or may be present in the form of aromatic esters, ethers, etheresters, and ketones.

In one or more specific embodiments, the radicals $R_1$, $R_2$, $R_3$, and $R_4$ are each identical or different acyclic aliphatic radicals, these radicals $R_1$, $R_2$, $R_3$, and $R_4$ very specifically having one to four carbon atoms. With particular preference the radicals $R_1$, $R_2$, $R_3$, and $R_4$ are methyl radicals.

In one or more embodiments, the zinc-amidine complexes (D) are, moreover, those in which the carboxylate radical of the zinc-amidine complex (D) is selected from the group of carboxylate radicals of aliphatic linear and/or branched, optionally substituted monocarboxylic acids having 1 to 12 C atoms in the alkyl radical and/or of aromatic, optionally substituted monocarboxylic acids having 6 to 12 C atoms in the aryl radical. The carboxylate radical largely determines the solubility of the resultant complex in the film-forming components used. Used very specifically in the coating material compositions of the invention, therefore, are zinc-amidine complexes which are obtainable by reacting 1.0 mole of zinc(III) bis(2-ethylhexanoate) with 2.0 to 3.0 moles of an amidine (I).

In one or more specific embodiments, coating material compositions are those comprising as component (D) Zn(1,1,3,3-tetramethylguanidine)$_a$ (acetate)$_2$, (formate)$_2$, Zn(1,1,3,3-tetramethylguanidin)$_a$ (benzoate)$_2$, Zn(1,1,3,3-tetramethylguanidine)$_a$ (2-ethylhexanoate)$_2$, Zn(1,1,3,3-tetramethylguanidine)$_a$ (octoate)$_2$, Zn(1,1,3,3- tetramethylguanidin)$_a$ (neodecanoate)$_2$, Zn(1,3-diphenylguanidine)$_a$ (formate)$_2$, Zn(1,3-diphenylguanidine)$_a$ (acetate)$_2$, Zn(1,3-diphenylguanidine)$_a$ (benzoate)$_2$, Zn(1,3-diphenylguanidine)$_a$ (2-ethylhexanoate)$_2$, Zn(1,3-diphenylguanidin)$_a$ (octoate)$_2$, and/or Zn(1,3-diphenylguanidine)$_a$ (neodecanoate)$_2$, preferably Zn(1,1,3,3-tetramethylguanidine)$_a$ (2-ethyl-hexanoate)$_2$ and/or Zn(1,1,3,3-tetramethylguanidine)$_a$ (octoate)$_2$ and/or Zn(1,1,3,3-tetramethylguanidine)$_a$ (neodecanoate)$_2$, and/or Zn(1,3-diphenylguanidine)$_a$ (2-ethylhexanoate)$_2$ and/or Zn(1,3-diphenylguanidine)a (octoate)2, where in each case a=1.0 to 4.0 with particular preference and a=2.0 to 3.0 with very particular preference. Especially preferred are coating material compositions which comprise as component (D) Zn(1,1,3,3-tetramethylguanidine)$_a$ (2-ethylhexanoate)$_2$ and/or Zn(1,1,3,3-tetramethylguanidine)$_a$ (octoate)$_2$ and/or Zn(1,1,3,3-tetramethylguanidine)$_a$ (neodecanoate)$_2$, with in each case a=1.0 to 4.0 with particular preference and a=2.0 to 3.0 with very particular preference.

In one or more embodiments, the reaction of the zinc(II) biscarboxylate or carboxylates with the amidine or amidines (I) takes place typically in an aprotic solvent. Solvents used in this context are more particularly those solvents which allow a sufficient solubility of the zinc(II) biscarboxylates and of the zinc amidines and which in the coating material are chemically inert toward the compounds (A), (B), (D), (S), and optionally (C), and which during the curing of the coating material as well do not react with (A), optionally (C), (B), (D) and (S). Examples of such solvents are aliphatic and/or aromatic hydrocarbons such as toluene, xylene, solvent naphthla, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. In one or more embodiments, the aprotic solvents or solvent mixtures have a water content of not more than 1% by weight, more specifically not more than 0.5% by weight, based on the solvent.

In one or more embodiments, the reaction of the zinc(II) biscarboxylate or carboxylates with the amidine or amidines (I) may also take place in the polyhydroxyl group-containing component (A) and/or in the low molecular mass alcohols recited as component (C), optionally in a mixture with further solvents—such as, more particularly, the solvents (L) just recited.

It is also possible to carry out the reaction of the zinc(II) biscarboxylate or carboxylates with the amidine or amidines (I) in the total mixture of the film-forming component (K-I) (referred to as "binder component"), comprising the hydroxyl-containing compounds (A) and optionally (C), optionally the solvent, and optionally one or more of the coatings additives (F) recited below.

In one or more embodiments, the reaction of the zinc(II) biscarboxylate or carboxylates with the amidine or amidines (I) takes place typically at room temperature or a slightly elevated temperature of up to 100° C. It is usual here for the zinc(II) biscarboxylate to be introduced as an initial charge in the solvent and/or in the hydroxyl-containing compound (A) and/or (C)—as just described—and for the amidine compound, optionally in solution in one of the stated solvents, to be added slowly dropwise. After the evolution of heat has subsided, the mixture is stirred for 2 hours more at not less than 60° C.

An additional possibility, especially when the coating material compositions are 2-component coating material compositions, is to prepare the active catalyst compound (D) in situ. For this purpose, a corresponding amount of the amidine or amidines is dissolved in the film-forming component (K-I) comprising the hydroxyl-containing binder (A) and optionally (C), and a corresponding amount of the zinc(II) biscarboxylate is dissolved in the film-forming component (K-II) comprising the polyisocyanate group-containing compound (B). When the two film-forming components are mixed prior to application, the zinc-amidine complex is then formed in situ in the coating material composition.

Monomeric Aromatic Carboxylic Acid (S)

In one or more embodiments, it is further essential to the invention that the coating material composition comprises at least one monomeric aromatic, optionally substituted carboxylic acid (S) whose carboxyl group is in conjugation with a π-electron system. Here, the number of carboxyl groups may vary, the carboxylic acids preferably having one carboxyl group. In one or more embodiments, the monomeric aromatic, optionally substituted carboxylic acids have a molecular weight <500 g/mol, more specifically <300 g/mol. In one or more specific embodiments, monomeric aromatic, optionally substituted carboxylic acids which have a pKa of 2 to 5 are used. The pKa corresponds to the pH at the half-equivalent point, the solution medium being preferably water. Should it not be possible for an acid to specify a pKa in water, then the medium selected is DMSO or else another suitable medium in which the acid is soluble.

Suitability is possessed by monomeric aromatic monocarboxylic and polycarboxylic acids, the corresponding alkyl- and aryl-substituted aromatic monocarboxylic and polycarboxylic acids, and also the corresponding hydroxyl-containing aromatic monocarboxylic and polycarboxylic acids, such as, for example, phthalic acid and terephthalic acid, alkyl- and/or aryl-substituted phthalic acid and terephthalic acid, benzoic acid and alkyl- and/or aryl-substituted benzoic acid, aromatic carboxylic acids having further functional groups such as salicylic acid and acetylsalicylic acid, alkyl- and/or aryl-substituted salicylic acid or isomers thereof, polycyclic aromatic carboxylic acids, such as the isomers of naphthalenecarboxylic acid, and derivatives thereof.

In one or more embodiments, as monomeric aromatic carboxylic acid (S), the coating material composition comprises benzoic acid, tert-butylbenzoic acid, 3,4-dihydroxybenzoic acid, salicylic acid and/or acetylsalicylic acid, more specifically benzoic acid.

The Combination of Components (A), (B), Optionally (C), (D), and (S), and Also Further Components of the Coating Material Compositions In one or more embodiments, where the compositions are one-component coating material compositions, polyisocyanate group-containing compounds (B) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. In specific embodiments, the isocyanate groups of component (B) are blocked with 3,5-dimethylpyrazole.

In the case of the 2-component (2K) coating material compositions, a coatings component comprising the polyhydroxyl group-containing compound (A) and also further components, described below, is mixed shortly before application of the coating material with a further coatings component, comprising the polyisocyanate group-containing compound (B) and also, optionally, other of the components described below, mixing taking place in a manner known per se; in general, the coatings component which comprises the compound (A) comprises the catalyst (D) and also a part of the solvent.

In one or more embodiments, the polyhydroxy component (A) may be present in a suitable solvent. Suitable solvents are those which allow sufficient solubility of the polyhydroxy component. Examples of such solvents are the solvents (L) which have already been listed above.

In one or more embodiments, the weight fractions of the polyol (A) and optionally (C) and of the polyisocyanate (B) are selected such that the molar equivalents ratio of the hydroxyl groups of the polyhydroxyl group-containing compound (A) plus optionally (C) to the isocyanate groups of component (B) is between 1:0.9 and 1:1.5, specifically between 1:0.9 and 1:1.1, more specifically between 1:0.95 and 1:1.05.

In one or more embodiments, coating material compositions which comprise from 20% to 80% by weight, specifically from 30% to 70% by weight, based in each case on the binder content of the coating material composition, of at least one polyhydroxyl group-containing compound (A), more particularly of at least one polyhydroxyl group-containing polyacrylate (A) and/or at least one polyhydroxyl group-containing polymethacrylate (A) are used.

In one or more specific embodiments, coating material compositions which comprise from 5% to 79% by weight, specifically from 25% to 69% by weight, based in each case on the binder content of the coating material composition, of the polyisocyanate group-containing compound (B) are used.

In one or more embodiments, the coating material compositions of the invention further comprise at least one zinc-amidine complex (D) in an amount such that the metal content of the zinc-amidine complex, based in each case on the binder content of the coating material composition, is between 35 and 2000 ppm, specifically between 35 and 1000 ppm, and more specifically between 100 and 1000 ppm.

In one or more embodiments, the coating material compositions of the invention further comprise 0.2% to 15.0% by weight, specifically 0.5% to 8.0% by weight, and more specifically 0.5% to 5.0% by weight, of at least one aromatic carboxylic acid (S), the percentages by weight being based in each case on the binder content of the coating material composition.

By binder fraction is meant in each case the fraction of the coating material composition, prior to crosslinking, which is soluble in tetrahydrofuran (THF). For this purpose, a small sample (P) is weighed out and dissolved in 50 to 100 times the amount of THF, insoluble constituents are removed by filtration, the THF is evaporated off, and subsequently the solids of the previously THF-dissolved constituents is ascertained by drying the remaining sample at 130° C. for 60 minutes, cooling it in a desiccator, and then weighing it again. The residue corresponds to the binder content of the sample (P).

In one or more embodiments, the coating material compositions of the invention are nonaqueous coating materials and may comprise solvent or may be formulated as solvent-free systems. Examples of suitable solvents are the solvents (L) which have already been listed above. In one or more embodiments, the solvent or solvents are used in the coating material compositions in an amount such that the solids content of the coating material composition is at least 50% by weight, more specifically at least 60% by weight.

Additionally, the coating material compositions of the invention may comprise 0% to 30% by weight, specifically 0% to 15% by weight, based in each case on the binder content of the coating material composition, of one or more amino resins and/or one or more tris(alkoxycarbonylamino) triazines (E).

Examples of suitable tris(alkoxycarbonylamino)triazines are given in U.S. Pat. No. 4,939,213, in U.S. Pat. No. 5,084,541, and in EP-A-0 624 577.

Examples of suitable amino resins (E) are all of the amino resins typically used in the coating industry sector, the properties of the resultant coating materials being controllable via the reactivity of the amino resin. The resins are condensation products of aldehydes, especially formaldehyde, and, for example, urea, melamine, guanamine, and benzoguanamine. The amino resins comprise alcohol groups, preferably methylol groups, generally some of which, or preferably all of which, are etherified with alcohols. Use is made in particular of amino resins etherified with lower alcohols. In one or more embodiments, amino resins etherified with methanol and/or ethanol and/or butanol, examples being the products available commercially under the names Cymel®, Resimene®, Maprenal®, and Luwipal® are used.

The amino resins (E) are long-established compounds and are described in detail in, for example, the American patent application U.S. 2005/0182189 A1, page 1, paragraph [0014], to page 4, paragraph [0028].

In one or more embodiments, the binder mixture of the invention and/or the coating material composition of the invention may further comprise at least one customary and known coatings additive (F) in effective amounts, i.e., in amounts specifically up to 30%, more specifically up to 25%, and more particularly up to 20%, by weight, based in each case on the binder content of the coating material composition.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
reactive diluents different from components (A) and (C), more particularly reactive diluents which become reactive only through reaction with further constituents and/or with water, such as Incozol® or aspartic esters, for example;
wetting agents different from components (A) and (C), such as siloxanes, fluorine-containing compounds, carboxylic monoesters, phosphoric esters, polyacrylic acids and their copolymers, or polyurethanes;
adhesion promoters;
flow control agents;
film-forming assistants such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheology control additives different from components (A) and (C), such as the additives known from patents WO 94/22968, EP-A-0 276 501, EP-A-0 249 201 or WO 97/12945; crosslinked polymeric microparticles, of the kind disclosed in EP-A-0 008 127, for example; inorganic phyllosilicates such as aluminum magnesium silicates, sodium magnesium and sodium magnesium fluorine lithium phyllosilicates of the montmorillonite type; silicas such as Aerosils®; or synthetic polymers having ionic and/or associative groups, such as poly(meth)acylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;

flame retardants.

In one or more embodiments, the coating material compositions comprise

30% to 70% by weight, based on the binder content of the coating material composition, of at least one polyhydroxyl group-containing polyacrylate (A) and/or at least one polyhydroxyl group-containing polymethacrylate (A), 25% to 69% by weight, based on the binder content of the coating material composition, of the polyisocyanate group-containing compound (B), 0% to 10% by weight, based on the binder content of the coating material composition, of the hydroxyl-containing component (C), 0.5% to 5.0% by weight, based on the binder content of the coating material composition, of at least one aromatic carboxylic acid (S), 0% to 15% by weight, based on the binder content of the coating material composition, of one or more amino resins and/or one or more tris(alkoxycarbonylamino)triazines (E), 0% to 20% by weight, based on the binder content of the coating material composition, of at least one customary and known coatings additive (F)

and at least one zinc-amidine complex (D) in an amount such that the metal content of the zinc-amidine complex, based in each case on the binder content of the coating material composition, is between 100 and 1000 ppm.

In a further embodiment of the invention, the binder mixture or coating material composition of the invention may further comprise other pigments and/or fillers and may serve for producing pigmented topcoats and/or pigmented undercoats or primer-surfacers, more particularly pigmented topcoats. The pigments and/or fillers that are used for these purposes are known to the skilled person. The pigments are typically used in an amount such that the pigment-to-binder ratio is between 0.05:1 and 1.5:1, based in each case on the binder content of the coating material composition.

Since the coatings of the invention produced from the coating materials of the invention also adhere outstandingly to already-cured electrocoat finishes, surfacer finishes, basecoat finishes or customary and known clearcoat finishes, they are outstandingly suitable not only for use in automotive OEM (production-line) finishing but also for automotive refinish and/or for the coating of parts for installation in or on automobiles and/or for the coating of utility vehicles.

The coating material compositions of the invention may be applied by all of the customary application methods, such as spraying, knifecoating, spreading, pouring, dipping, impregnating, trickling or rolling, for example. In the course of such application, the substrate to be coated may itself be at rest, with the application equipment or system being moved. Alternatively, the substrate to be coated, more particularly a coil, may be moved, with the application system being at rest relative to the substrate or being moved appropriately.

In one or more embodiments, spray application methods, such as, for example, compressed-air spraying, airless spraying, high-speed rotation, electrostatic spray application (ESTA), alone or in conjunction with hot spray application such as, for example, hot-air spraying are used.

The applied coating materials of the invention can be cured after a certain rest time. The rest time serves, for example, for the flow and devolatization of the coating films or for the evaporation of volatile constituents such as solvents. The rest time may be assisted and/or shortened by use of elevated temperatures and/or by a reduced atmospheric humidity, provided that this does not entail any damage to or change in the coating films, such as premature complete crosslinking, for instance.

There are no peculiarities of method as far as the thermal curing of the coating materials is concerned; this curing instead takes place in accordance with the customary and known methods such as heating in a forced-air oven or irradiation with IR lamps. Thermal curing here may also take place in stages. Another preferred method of curing is that using near infrared (NIR radiation).

Thermal curing takes place advantageously at a temperature of 20 to 200° C. for a time of 1 minute up to 10 hours, and even longer cure times may be employed at low temperatures. For automotive refinish and for the painting of plastics parts, and also for the finishing of utility vehicles, it is usual to employ relatively low temperatures, which are between 20 and 80° C., more particularly between 20 and 60° C.

The coating material compositions of the invention are outstandingly suitable for use as decorative, protective and/or effect coatings and finishes on bodywork of means of transport (more particularly motor vehicles, such as cycles, motorcycles, buses, trucks or automobiles) or of parts thereof; of the interior and exterior of edifices; of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

Consequently, the coating material compositions of the invention can be applied, for example, to an uncoated or precoated substrate, the coating materials of the invention being either pigmented or unpigmented. The coating material compositions and finishes of the invention, more particularly the clearcoat finishes, are employed more particularly in the technologically and esthetically particularly demanding field of automotive OEM finishing and for the coating of plastics parts for installation in or on automobile bodies, more particularly for top-class automobile bodies, such as, for example, for producing roofs, tailgates, engine cowlings, fenders, bumpers, spoilers, sills, protective strips, side trim, and so on, and also for automotive refinish and for the finishing of utility vehicles, such as, for example, of trucks, chain-driven construction vehicles, such as crane vehicles, wheel loaders, and concrete mixers, buses, rail vehicles, watercraft, aircraft, and also agricultural equipment such as tractors and combines, and parts thereof.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene-acrylonitrile polymers wherein graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

In one or more embodiments, the coating material compositions are used in multistage coating methods, more particularly in methods which involve applying, to an uncoated or precoated substrate, first a pigmented basecoat film and thereafter a coat with the coating material composition of the invention. The invention accordingly also provides multicoat effect and/or color coating systems comprising at least one pigmented basecoat film and, disposed thereon, at least one clearcoat film, characterized in that the clearcoat film has been produced from the coating material composition of the invention.

Not only water-thinnable basecoats but also basecoats based on organic solvents may be used. Suitable basecoats are described in, for example, EP-A-0 692 007 and the documents cited therein at column 3, lines 50 et seq. In one or more embodiments, the applied basecoat is first dried, which means that, in an evaporation phase, at least some of the organic solvent and/or the water is removed from the basecoat film. Drying takes place at temperatures from room temperature to 80° C. After drying has taken place, the coating material composition of the invention is applied. The two-coat finish is then baked, under conditions employed in automotive OEM finishing, at temperatures from 20 to 200° C. for a time from 1 minute up to 10 hours, and even longer curing times may be employed in the case of the temperatures employed for automotive refinish, which are generally between 20 and 80° C., more particularly between 20 and 60° C.

In one or more embodiments, the coating material composition of the invention is used as a transparent clearcoat for the coating of plastics substrates, more particularly of plastics parts for installation in or on other articles. These plastics parts are likewise coated in a multistage coating method, which involves applying, to an uncoated or precoated substrate or to a substrate which has been pretreated for improved adhesion of the subsequent coatings (for example, by flaming, corona treatment or plasma treatment of the substrate), first a pigmented basecoat film and thereafter a coat with the coating material composition of the invention.

EXAMPLES

Gel Permeation Chromatography (GPC)

The gel permeation chromatography was carried out at 40° C. using a high-pressure liquid chromatography pump and a refractive-index detector. The eluent used was tetrahydrofuran, with an elution rate of 1 ml/min. The calibration was carried out by means of polystyrene standards. The number-average molecular weight Mn, the weight-average molecular weight Mw, and Mp were ascertained, the polydispersity index Mp being calculated from Mp=Mw/Mn.

Hydroxyl Number

The hydroxyl number is calculated via the fraction of OH-functional components used and expressed in mg of KOH per gram of resin solids.

Solids Determination

Approximately 1 g of sample are weighed out into a tinplate lid. Following addition of around 3 ml of butyl acetate, the sample is dried in a drying cabinet at 130° C. for 60 minutes, cooled in a desiccator, and then weighed again. The residue corresponds to the solids fraction.

Binder Content Determination

The binder fraction means in each case that fraction of the coating material composition that is soluble in tetrahydrofuran (THF), prior to crosslinking. For its determination, a small sample (P) is weighed out, dissolved in 50 to 100 times the amount of THF, insoluble constituents are removed by filtration, the THF is evaporated off, and then the solids of the constituents previously dissolved in THF is ascertained by drying at 130° C. for 60 minutes, cooling in a desiccator, and then repeat weighing. The residue corresponds to the binder content of the sample (P).

Freedom from Tack by the Zapon Tack Test (ZTT):

An aluminum strip with a thickness of 0.5 mm, a width of 2.5 cm, and a length of 11 cm is bent at an angle of 110° to give a surface measuring 2.5×2.5 cm. The long side of the metal plate is bent, after a further 2.5 cm, by about 15°, so that the plate is just held in balance by a weight (5 g) placed in the center of the square area. For the measurement of the ZTT tack-free state, the bent plate is placed on the coating film and weighed down with a 100 g weight for 30 seconds. Following removal of the weight, the coating is considered tack-free if the metal angle falls over within 5 s. The test is repeated at intervals of 15 minutes. Before the test is deployed, the tackiness of the coating film is assessed qualitatively by touch. In the case of tests at elevated temperature, the test panels are stored at room temperature for 10 minutes for cooling before the test is commenced. Freedom from tack was measured with the Zapon tack test by curing the coating for 30 min at 60° C. and beginning the test after storing the panels for 10 minutes at room temperature, and freedom from tack was measured with the Zapon tack test while keeping the coating at room temperature.

Print Test:

The coating film is drawn down using a 100 micrometer applicator onto a glass plate. After drying at 60° C. for 15 minutes or drying at 60° C. for 30 min, the glass plate, within a period of 10 minutes following removal from the oven, is placed on a commercial laboratory balance. Using thumb pressure, the film is then loaded with a weight of 2 kg for 20 seconds. This test is repeated every 10 minutes. In the case of a coating film which is obviously still soft or tacky, the coating film is first left until it has reached a sufficient freedom from tack, and a sufficient hardness. The tests are evaluated after a storage time of 24 hours. For the evaluation, the surface of the coating is washed off with aqueous surfactant solution (commercial washing-up detergent) and a soft cloth, in order to remove grease marks. Measurement is always against a standard. The coating is considered satisfactory if there is no visible thumb imprint on the coating film. This test is a measure of the assembly strength of refinishes—the earlier that the coating film has attained its assembly strength after forced drying, the earlier that assembly operations (or disassembly operations to remove adhesive masking) may be commenced on the refinished bodywork.

In each case, the time in minutes is given after which the imprint in the print test after drying at 60° C. for 15 min or drying at 60° C. for 30 min and subsequent storage of the panels for 10 minutes at room temperature is no longer visible.

Drying Recorder:

The coating is drawn down using a 100 μm four-way bar applicator onto glass plates with dimensions of 280 mm×25 mm. With the aid of the Byk Dry-time Recorder, needles are drawn over the film at a defined speed, at room temperature (20-23° C.) and a relative humidity of 40% to 60%. Assessments are made of 3 different phases and also of the total length (i.e., sum of phase 1+phase 2+phase 3) of the track.

Phase 1: the needle track closes up again

Phase 2: the needle track results in a deep furrow in the coating film

Phase 3: the needle causes only superficial damage to the film

The assessment is always undertaken against a standard.

In each case the total length of the scratch track in cm and the length of the scratch track in cm in each case after phase 1, 2 and 3 are given.

Potlife:

For this, the viscosity of a paint sample is measured at room temperature in the DIN4 flow cup. Beforehand, the sample is adjusted to a flow viscosity of 19-20 seconds in the DIN4 cup. Thereafter, the increase in viscosity is determined at suitable time intervals. As soon as the sample has doubled its initial viscosity, the potlife limit is reached. In each case the viscosity of the coating material composition measured at room temperature in the DIN4 flow cup directly after preparation thereof and after one, two, three and four hours after preparation thereof are given.

Pendulum Hardness:

The hardness of the paint films is determined by means of pendulum damping according to Koenig in accordance with DIN 53157. The pendulum strikes are reported. The pendulum hardness was measured after storage of the coating for 1 or 3 or 7 days at room temperature, and the pendulum hardness was measured after curing the coating at 60° C. for 30 min and subsequent storage of the coating for 1 or 3 or 7 days at room temperature.

Millbase:

86.4 g of a styrene-containing polyacrylate (62% in Solventnaphta®/ethoxyethyl propionate/methyl isobutyl ketone (20/46/34)) having a molecular weight of 1600-2200 (Mn) and 4000-5000 (Mw), a measured acid number of 12-16 mg KOH/g, a calculated OH number (OHN) of about 130 mg KOH/g (resin solids), and a viscosity of the 60% strength solution in butyl acetate of 200-400 mPa·s, measured using a rotary viscometer (Brookfield CAP 2000, spindle 3, 1000 rpm), are stirred together with 6.4 g of methyl isobutyl ketone, 2.2 g of a commercial light stabilizer mixture composed of UV and HALS light stabilizers and also with 0.15 g of a commercial flow control agent based on a polyacrylate, to form a homogeneous mixture. Added to this mixture, where indicated, is the corresponding catalyst, which is mixed in with stirring. When benzoic acid is used, it is dissolved as a solid in the millbase mixture, with stirring. For adjustment of viscosity, a further 1.0 parts of methyl isobutyl ketone and 2.80 parts of butyl acetate are added.

Curing Agent Solution:

In accordance with WO 2009/077180, a curing agent is prepared according to the following formula, with a degree of conversion of the NCO groups of around 32%-35%:

A 250 ml three-neck flask with stirring magnet, internal thermometer and dropping funnel is charged with a mixture of 51.6 g of a trimerized isocyanurate based on hexamethyl 1,6-diisocyanate (SC 100%) [Desmodur® N 3600, Bayer, Leverkusen], 13.6 g of butyl acetate and 2.4 g of triethyl orthoformate. Under nitrogen blanketing, a mixture of 26.4 g of bis[3-trimethoxysilylpropyl]amine (Dynasylan® 1124, EVONIK, Rheinfelden) and 2.0 g of N-[3-(trimethoxysilyl) propyl]butylamine (Dynasylan® 1189, EVONIK, Rheinfelden) is added slowly dropwise via the dropping funnel. The reaction is exothermic. The rate of addition is selected such that the internal temperature does not exceed a maximum of 60° C. Thereafter a further 4 g of butyl acetate are added via the dropping funnel. The batch is held at 60° C. for four hours more until the titrimetric determination of the isocyanate content (in accordance with DIN EN ISO 11909) gives a constant value of 8.3%-8.8% NCO, based on solids. The molar ratio of Dynasylan® 1124 to Dynasylan® 1189 is 10:1.

Preparation of the Inventive Catalysts

Zinc 2-ethylhexanoate is introduced as an initial charge in the stated amount of butyl acetate. 1,1,3,3-Tetramethylguanidine is then added slowly dropwise. After the exothermic reaction has subsided, stirring then takes place for 20 minutes more at room temperature.

|  | Catalyst K1 | Catalyst K2 | Catalyst K3 | Catalyst K4 |
|---|---|---|---|---|
| Zinc(II) bis(2-ethylhexanoate) | 60.27 g (0.171 mol) | 48.34 g (0.137 mol) | 40.36 g (0.115 mol) | 34.64 g (0.1 mol) |
| 1,1,3,3-Tetramethylguanidine | 19.73 g (0.171 mol) | 31.656 g (0.275 mol) | 39.64 g (0.344 mol) | 45.36 g (0.4 mol) |
| Butyl acetate | 20 g | 20 g | 20 g | 20 g |

Comparative Catalyst (CC1)

In accordance with WO 2009/077180, a DABCO-based catalyst was prepared as follows:

Item 1: 11.78 g (0.105 mol) of 1,4-diazabicyclo[2.2.2]octane
Item 2: 32.24 g (0.100 mol) of bis(2-ethylhexyl)phosphate
Item 3: 10.00 g of methyl isobutyl ketone
Item 4: 20.00 g of ethyl acetate A 100 ml three-neck flask equipped with reflux condenser and stirrer is charged under nitrogen blanketing with items 1, 3 and 4. At about 45° C., item 4 is slowly added dropwise, during which the temperature is held at not more than 50° C. After further stirring for 3 hours at 40° C., the solvent mixture is removed on a rotary evaporator. The residue is then taken up with isopropanol. This gives a 50% strength solution of the catalyst CC1.

Added to this mixture is the corresponding catalyst, which is mixed in with stirring. When benzoic acid is used, it is dissolved as a solid in the millbase mixture beforehand, with stirring. For adjustment of viscosity, a further 1.0 parts of methyl isobutyl ketone and 2.80 parts of butyl acetate are added.

Experimental Procedure:

Additional components such as benzoic acid and catalyst solutions are dissolved in the millbase. Following gentle stirring, clear solutions are obtained. For the implementation of the experiments, the millbase is introduced and the curing agent is added. The solution is homogenized by stirring.

For the viscosity measurements, adjustment to the specified viscosity is made by addition of a mixture of methyl isobutyl ketone/butyl acetate in the ratio 1:3. For the glass drawdowns, the viscosity adjustment is not made.

For the drying test, the coating film is drawn down using a 100 µm four-way bar applicator onto glass plates to produce a film thickness of 30-35 µm. For the testing of the pendulum hardness, the film is poured onto glass plates, and before the Koenig film hardness is ascertained, the thickness of the applied film at the score mark (DIN 50933) is measured. For the tests using a drying recorder, the samples are likewise drawn down using a 100 µm four-way bar applicator onto suitable glass strips with length of approximately 300 mm and a width of approximately 25 mm; the film thicknesses achieved thereby are 30-35 µm.

Comparative Examples C1 and C2

First of all, the coating materials of comparative examples C1 and C2 were prepared, each with the same amount of phosphorus-based catalyst in accordance with WO 09/077180 but in the comparative example C1 with benzoic acid and in the comparative example C2 without benzoic acid. The composition of these coating materials of comparative examples C1 and C2, and also the test results on the resultant coatings, are set out in table 1.

TABLE 1

Composition of the coating materials of comparative examples C1 and C2 in parts by weight, and the test results on the resultant coatings

|  | C1 | C2 |
|---|---|---|
| Millbase | 50 | 50 |
| Benzoic acid | 0.84 |  |
| Catalyst CC1 | 0.14 | 0.14 |
| Silanized curing agent | 33.8 | 33.8 |
| Pendulum damping |  |  |
| 1 day RT | 34 | 7 |
| 1 day 15' 60° C. | 20 | 8 |
| 1 day 30' 60° C. | 47 | 10 |
| 3 days RT | 113 | 51 |
| 3 days 15' 60° C. | 111 | 53 |
| 3 days 30' 60° C. | 109 | 53 |
| 7 days RT | 134 | 86 |
| 7 days 30' 60° C. | 118 | 88 |
| Print test 15 min 60° C. | 320 | >360 |
| Print test 30 min 60° C. | 40 | >360 |

Inventive Examples 1 and 2 and Comparative Examples C3 and C4

First of all the coating materials of inventive examples 1 and 2 were prepared each with the same amount of zinc-amidine complex, but with different inventive catalyst, K1 in example 1 and K2 in example 2. Moreover, the coating material compositions of comparative examples C3 and C4 were prepared, and differed from the inventive examples B1 and B2 only in that they contain no benzoic acid. The composition of these coating materials of inventive examples 1 and 2 and of comparative examples C3 and C4, and also the test results on the resultant coatings, are set out in table 2.

TABLE 2

Composition of the coating materials of inventive examples 1 and 2 and of comparative examples C3 and C4 in parts by weight and also the test results on the resultant coatings

|  | B1 | C3 | B2 | C4 |
|---|---|---|---|---|
| Formula |  |  |  |  |
| Millbase | 50 | 50 | 50 | 50 |
| Benzoic acid | 1.36 |  | 1.36 |  |
| Catalyst K1 | 0.101 | 0.101 |  |  |
| Catalyst K2 |  |  | 0.126 | 0.126 |
| Silanized curing agent | 33.8 | 33.8 | 33.8 | 33.8 |
| Metal content[1] [ppm] | 158 | 162 | 257 | 263 |
| Results: |  |  |  |  |
| Potlife DIN 4 (s) |  |  |  |  |
| direct | 20 | 20 | 20 | 20 |
| after 1 h | 23 | 21 | 22 | 21 |
| after 2 h | 30 | 23 | 26 | 24 |
| after 3 h | n.m. | 29 | n.m. | 28 |
| after 4 h |  | 33 |  | 33 |
| ZAPON tack |  |  |  |  |
| 30 min 60° C. [min] | 0 | 270 | 0 | 180 |
| RT [min] | 2 h | >360 | 15 min | >360 |
| Pendulum damping |  |  |  |  |
| 1 day RT | 79 | 27 | 88 | 30 |
| 1 day after drying 30'/60° C. | 110 | 37 | 103 | 41 |

TABLE 2-continued

Composition of the coating materials of inventive examples 1 and 2 and of comparative examples C3 and C4 in parts by weight and also the test results on the resultant coatings

|  | B1 | C3 | B2 | C4 |
|---|---|---|---|---|
| 3 days RT | 85 | 67 | 112 | 62 |
| 3 days after drying 30'/60° C. | 132 | 68 | 130 | 79 |
| 7 days RT | 92 | 76 | 120 | 80 |
| 7 days after drying 30'/60° C. | 142 | 83 | 139 | 92 |
| Drying recorder |  |  |  |  |
| Total length of scratch track | 18.3 | 20.7 | 16.1 | 23 |
| Phase 1 | 4 | 7 | 5.1 | 9 |
| Phase 2 | 13.8 | 12 | 8.6 | 10.7 |
| Phase 3 | 2.8 | 3.1 | 2.8 | 4.6 |
| Print test 15 min 60° C. [min] | 200 | >360 | 40 | >360 |

[1] the figure reported is the amount of catalyst K1 or K2 in ppm metal content, based on the binder fraction of the coating material composition Inventive Examples 3 to 5

The coating materials of inventive examples 3 to 5 were prepared each with the same amount of zinc-amidine complex, but with different amounts of benzoic acid. The composition of these coating materials of inventive examples 3 to 5, and also the test results on the resultant coatings, are set out in table 3.

TABLE 3

Composition of the coating materials of inventive examples 3 to 5, in parts by weight, and the test results on the resultant coatings

|  | B3 | B4 | B5 |
|---|---|---|---|
| Millbase | 50 | 50 | 50 |
| Benzoic acid | 0.419 | 0.838 | 1.257 |
| Catalyst K2 | 0.106 | 0.106 | 0.106 |
| Silanized curing agent | 33.8 | 33.8 | 33.8 |
| Metal content 1) [ppm] | 220 | 220 | 220 |
| Results: |  |  |  |
| Potlife DIN 4 (s) |  |  |  |
| direct | 31 | 29 | 30 |
| after 1 h | 43 | 36 | 34 |
| after 2 h | 60 | 48 | 45 |
| after 3 h | n.m. | n.m. | 65 |
| after 4 h |  |  | n.m. |
| ZAPON tack |  |  |  |
| 30 min 60° C. [min] | 90 | 45 | 15 |
| RT [min] | 210 | 165 | 240 |
| Pendulum damping |  |  |  |
| 1 day RT | 59 | 69 | 75 |
| 1 day after drying 30'/60° C. | 104 | 89 | 115 |
| 3 days RT | 74 | 100 | 93 |
| 3 days after drying 30'/60° C. | 117 | 111 | 126 |
| 7 days RT | 121 | 120 | 111 |
| 7 days after drying 30'/60° C. | 140 | 142 | 142 |
| Drying recorder |  |  |  |
| Total length of scratch track | 15.9 | 14.8 | 16.7 |
| Phase 1 | 4.9 | 3.5 | 4.8 |
| Phase 2 | 7.5 | 6.9 | 7.4 |
| Phase 3 | 4 | 2.1 | 3.8 |
| Print test 15 min 60° C. [min] | 220 | 180 | 20 |

1) the figure reported is the amount of catalyst K2 in ppm metal content, based on the binder fraction of the coating material composition Inventive Examples 6 and 7 and Comparative Examples C5 and C6

First of all the coating materials of inventive examples 6 and 7 were prepared each with the same amount of zinc-amidine complex, but with different inventive catalyst, K3 in example 6 and K4 in example 7. Furthermore, the coating material compositions of comparative examples C5 and C6 were prepared, and differed from inventive examples B6 and B7 only in that they contain no benzoic acid. The composition of these coating compositions of inventive examples 6 and 7 and of comparative examples C5 and C6, and also the test results on the resultant coatings, are set out in table 4.

TABLE 4

Composition of the coating materials of inventive examples 6 and 7 and of comparative examples C5 and C6 in parts by weight, and the test results on the resultant coatings

|  | B6 | B7 | C5 | C6 |
|---|---|---|---|---|
| Millbase | 50 | 50 | 50 | 50 |
| Benzoic acid | 1.36 | 1.36 |  |  |
| Catalyst K3 | 0.152 |  | 0.152 |  |
| Catalyst K4 |  | 0.177 |  | 0.177 |
| Silanized curing agent | 33.8 | 33.8 | 33.8 | 33.8 |
| Metal content 1) [ppm] | 200 | 206 | 200 | 206 |
| Results: |  |  |  |  |
| Potlife DIN 4 (s) |  |  |  |  |
| direct | 26 | 27 | 24 | 25 |
| after 1 h | 31 | 34 | 30 | 31 |
| after 2 h | 39 | 40 | 35 | 39 |
| after 3 h | 56 | 67 | 50 | 54 |
| after 4 h | — | — | — | — |
| ZAPON tack |  |  |  |  |
| 30 min 60° C. [min] | 15 | 45 | >360 | >360 |
| RT [min] | 210 | 225 | >360 | >360 |
| Pendulum damping |  |  |  |  |
| 1 day RT | 85 | 79 | 66 | 53 |
| 1 day after drying 30'/60° C. | 130 | 115 | 89 | 94 |
| 3 days RT | 100 | 95 | 87 | 103 |
| 3 days after drying 30'/60° C. | 120 | 113 | 122 | 115 |
| 7 days RT | 121 | 113 | 123 | 114 |
| 7 days after drying 30'/60° C. | 139 | 117 | 137 | 122 |
| Drying recorder |  |  |  |  |
| Total length of scratch track | 11 | 20 | 13 | 12.5 |
| Phase 1 | 4.2 | 5 | 5 | 4.3 |
| Phase 2 | 4.1 | 4.6 | 2.7 | 2.5 |
| Phase 3 | 9.5 | 9.2 | 5 | 5.5 |
| Print test 15 min 60° C. [min] | 0 | 20 | >360 | >360 |

1) the figure reported is the amount of catalyst K3 or K4 in ppm metal content, based on the binder fraction of the coating material composition Discussion of the Test Results The test results show that complexes of zinc with amidines very effectively accelerate the crosslinking of OH acrylates with the stated hybrid curing agents. Particularly highly effective are these zinc-amidine complexes in combination with carboxylic acids whose carboxyl group is in conjugation with a π-electron system, such as benzoic acid, for example.

What is claimed is:

1. A nonaqueous coating material composition comprising
(A) at least one polyhydroxyl group-containing compound,
(B) at least one polyisocyanate group-containing compound having free or blocked isocyanate groups and
(D) at least one catalyst based on a zinc-amidine complex which is prepared by reacting one or more zinc(II) biscarboxylates with an amidine of the formula (I) or with a mixture of two or more amidines of the formula (I)

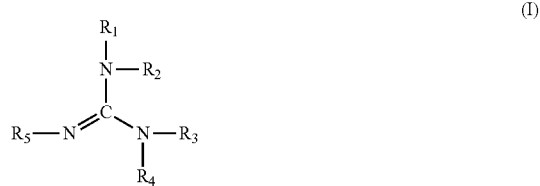

(I)

wherein $R_5$ is hydrogen and $R_1$, $R_2$, $R_3$, and $R_4$ are each identical or different radicals, with $R_1$ and $R_3$ being hydrogen or an alkyl radical or an aryl radical, and $R_2$ and $R_4$ being an alkyl radical or an aryl radical, wherein
component (B) has at least one structural unit of the formula (II)

—NR—(X—SiR''$_x$(OR')$_{3-x}$) (II), and/or at least one structural unit of the formula (III), —N(X—SiR''$_x$(OR')$_{3-x}$)$_n$(X'—SiR''$_y$(OR')$_{3-y}$)$_m$ (III), wherein
R is alkyl, cycloalkyl, aryl or aralkyl, it being possible for the carbon chain to be interrupted by nonadjacent oxygen, sulfur or NRa groups, wherein Ra is alkyl, cycloalkyl, aryl or aralkyl,
R' is hydrogen, alkyl or cycloalkyl, it being possible for the carbon chain to be interrupted by nonadjacent oxygen, sulfur or NRa groups, wherein Ra is alkyl, cycloalkyl, aryl or aralkyl,
X, X' are linear and/or branched alkylene or cycloalkylene radicals having 1 to 20 carbon atoms,
R'' is alkyl, cycloalkyl, aryl, or aralkyl, it being possible for the carbon chain to be interrupted by nonadjacent oxygen, sulfur or NRa groups, wherein Ra is alkyl, cycloalkyl, aryl or aralkyl,
n is 0 to 2, m is 0 to 2, m+n is 2, and x, y are 0 to 2,
and wherein the coating material composition comprises
(S) at least one monomeric aromatic optionally substituted carboxylic acid comprising a carboxyl group in conjugation with a π-electron system.

2. The coating material composition of claim 1, wherein the radicals $R_2$ and $R_4$ are identical or different acyclic, straight-chain or branched alkyl radicals and/or identical or different aryl radicals, and the radicals $R_1$ and $R_3$ are hydrogen or identical or different acyclic, straight-chain or branched alkyl radicals and/or identical or different aryl radicals.

3. The coating material composition of claim 1, wherein the zinc-amidine complex is prepared by reacting 1.0 mole of one or more zinc(II) biscarboxylates with at least 0.1 mole of one or more amidines of the formula (I).

4. The coating material composition of claim 1, wherein the carboxylate radical of the zinc-amidine complex (D) is selected from the group of carboxylate radicals of aliphatic linear and/or branched, optionally substituted monocarboxylic acids having 1 to 12 C atoms in the alkyl radical and/or of aromatic, optionally substituted monocarboxylic acids having 6 to 12 C atoms in the aryl radical.

5. The coating material composition of claim 1, wherein the coating material composition comprises at least one zinc-amidine complex (D) in an amount such that the metal content of the zinc-amidine complex, based in each case on the binder fraction of the coating material composition, is between 35 and 2000 ppm, and/or the coating material composition comprises 0.2% to 15.0% by weight of at least one aromatic carboxylic acid (S), the percentages by weight in turn being based in each case on the binder fraction of the coating material composition.

6. The coating material composition of claim 1, wherein between 10 and 90 mol % of the isocyanate groups originally present in component (B) were converted into structural units (II) and/or (III).

7. The coating material composition according of claim 1, wherein the total amount of structural units (II) in component (B) is between 5 and 70 mol %, based in each case on the entirety of the structural units (II) plus (III), and the total amount of structural units (III) in component (B) is between 95 and 30 mol %, based in each case on the entirety of the structural units (II) plus (III).

8. The coating material composition of claim 1, wherein component (B) comprises a polyisocyanate parent structure selected from 1,6-hexamethylene diisocyanate, isophorone diisocyanate, 4,4'-methylenedicyclohexyl diisocyanate, or the isocyanurate trimer thereof, or the allophanate dimer thereof, or the biuret dimer thereof, or the uretdione dimer thereof.

9. The coating material composition of claim 8, wherein component (B) is prepared by reacting the polyisocyanates or the isocyanate trimers thereof or the allophanate dimers thereof or the biuret dimers thereof or the uretdione dimers thereof with at least one compound of the formula (IIa)

H—NR—(X—SiR''$_x$(OR')$_{3-x}$)    (IIa)

or with at least one compound of the formula (IIIa)

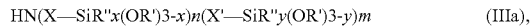

HN(X—SiR''$_x$(OR')$_{3-x}$)$_n$(X'—SiR''$_y$(OR')$_{3-y}$)$_m$    (IIIa), wherein R is alkyl, cycloalkyl, aryl or aralkyl, it being possible for the carbon chain to be interrupted by nonadjacent oxygen, sulfur or NRa groups, wherein Ra is alkyl, cycloalkyl, aryl or aralkyl, R' is hydrogen, alkyl or cycloalkyl, it being possible for the carbon chain to be interrupted by nonadjacent oxygen, sulfur or NRa groups, wherein Ra is alkyl, cycloalkyl, aryl or aralkyl, X, X' are linear and/or branched alkylene or cycloalkylene radicals having 1 to 20 carbon atoms, R'' is alkyl, cycloalkyl, aryl, or aralkyl, it being possible for the carbon chain to be interrupted by nonadjacent oxygen, sulfur or NRa groups, wherein Ra is alkyl, cycloalkyl, aryl or aralkyl, n is 0 to 2, m is 0 to 2, m+n is 2, and x, y are 0 to 2.

10. The coating material composition of claim 1, wherein, in component (B), the total amount of structural units (II) is between 9 and 40 mol % and the total amount of structural units (III) is between 91 and 60 mol %, based in each case on the entirety of the structural units (II) plus (III), and between 31 and 50 mol % of the isocyanate groups originally present in component (B) are converted into structural units (II) and (III), and, in component (B), between 26 and 35 mol % of the isocyanate groups originally present are converted into structural units (III).

11. The coating material composition of claim 1, wherein the coating material composition comprises from 20% to 80% by weight based in each case on the binder fraction of the coating material, of at least one hydroxyl-containing polyacrylate (A) and/or at least one hydroxyl-containing polymethacrylate (A), and the coating material composition comprises from 5% to 79% by weight, based in each case on the binder content of the coating material composition, of the compound (B) containing polyisocyanate groups.

12. A multistage coating method the method comprising applying to an optionally precoated substrate a pigmented basecoat film, followed by applying a film of the coating material composition of claim 1.

13. The multistage coating method of claim 12, wherein application of the pigmented basecoat film is followed first by drying of the applied pigmented basecoat material at temperatures from room temperature to 80° C., and the application of the coating material composition is followed by curing at temperatures between 20 and 80° C.

14. A multicoat color and/or effect paint system comprising at least one pigmented basecoat film and at least one clearcoat film disposed thereon, wherein the clearcoat film is produced from the coating material composition of claim 1.

* * * * *